United States Patent [19]

Kleinerman

[11] Patent Number: 4,849,811
[45] Date of Patent: Jul. 18, 1989

[54] SIMULTANEOUS AUDIO AND VIDEO TRANSMISSION WITH RESTRICTED BANDWIDTH

[76] Inventor: Ben Kleinerman, 300 Bayview Dr., Apt. 2006, North Miami Beach, Fla. 33160

[21] Appl. No.: 215,733

[22] Filed: Jul. 6, 1988

[51] Int. Cl.[4] .............................................. H04N 7/18
[52] U.S. Cl. ...................................... 358/133; 358/85; 358/903; 370/76; 379/97; 379/98; 379/100
[58] Field of Search ................ 358/133, 134, 903, 85, 358/280; 379/100, 97, 98; 370/76

[56] References Cited

U.S. PATENT DOCUMENTS

| | | | |
|---|---|---|---|
| 3,824,347 | 7/1974 | Sorber | 370/76 |
| 3,851,095 | 11/1974 | Kleinerman | 358/134 |
| 3,873,771 | 3/1975 | Kleinerman | 358/138 |
| 3,875,339 | 4/1975 | Gruen | 370/76 |
| 4,338,492 | 7/1982 | Snopko | 358/85 |
| 4,349,701 | 9/1982 | Snopko | 358/85 |
| 4,360,827 | 11/1982 | Braun | 358/85 |
| 4,386,365 | 5/1983 | Gargini | 379/90 |
| 4,388,489 | 6/1983 | Wigan | 379/96 |
| 4,467,355 | 8/1984 | Matsuda | 358/134 |
| 4,485,400 | 11/1984 | Lemelson | 358/85 |
| 4,494,144 | 1/1985 | Brown | 379/100 |
| 4,503,468 | 3/1985 | Serinken | 379/100 |
| 4,561,020 | 12/1985 | Matsuda | 358/134 |
| 4,715,059 | 12/1987 | Cooper-Hart | 379/98 |

Primary Examiner—Howard W. Britton
Attorney, Agent, or Firm—Brooks Haidt Haffner & Delahunty

[57] ABSTRACT

Method for simultaneously sending audio and video signals over standard telephone lines or other channels having a restricted bandwidth which comprises obtaining a video image, digitizing the image, modulating a signal with the digitized image, obtaining audio signals and filtering the audio signals to a frequency range of the band outside that of the modulated video signal, combining the filtered audio signals and the video signal, and transmitting such signals through the restricted bandwidth channel, together with a method for receiving such signals and apparatus for sending and receiving such signals.

15 Claims, 3 Drawing Sheets

SIMULTANEOUS AUDIO AND VIDEO TRANSMISSION WITH RESTRICTED BANDWIDTH

BACKGROUND OF THE INVENTION

The present invention relates to a novel method and apparatus for the simultaneous transmission of audio and video information over a medium with restricted bandwidth, and more particularly, it relates to the transmission of digitized video images in part of the band of such media, while voice or other audio information is simultaneously transmitted through another portion of the band.

It is well known that standard NTSC video images can be sent on coaxial cable, optical fiber, earth satellite, and microwave links. Such links have pass bands in the megahertz to gigahertz range, and so are capable of transmitting a 4.5- or 6-MHz signal required for NTSC video (or even greater bandwidths for SECAM and HDTV) and/or audio and video transmission in real time.

Such transmission is relatively costly because of the bandwidth requirements and the concomitant need for expensive cabling. For various historical and practical reasons, the conventional telephone "loop" or connection from a local subscriber to a central office is by means of a twisted-wire pair. The telephone system deliberately utilizes an overall band width of about 4 kHz, and in practice the pass band utilized encompasses from about 100 to about 3500 hertz. This is considered adequate, not only to convey the meaning of speech, but also to provide at least some of the particular timbre or character of a speaker's voice so that individual voices can frequently be recognized.

Amateur radio has available a relatively limited bandwidth, but over the years radio amateurs have successfully transmitted video images with a technique called "slow-scan television". A number of these techniques are described, for example, in Ingram, "The Complete Handbook of Slow-Scan TV", Tab Books, 1977. These techniques have enabled the transmission of images over distances of three-quarters of the earth's circumference, without satellite or forward-scatter techniques. Moreover, the simultaneous transmission of video and audio signals through ordinary telephone lines has been shown in U.S. Pat. No. 3,873,771. The method of the patent utilizes an FM slow-scan video signal and an AM single side band signal occupying the bandwidth of 100 to 1000 hertz. This narrowed audio signal can sacrifice some of the clarity of the voice and some of the distinctive character and timbre otherwise perceived at the receiver. An improvement of this patent in U.S. Pat. No. 3,851,095 describes the use of an image storage tube. Such apparatus is available, but the cost is relatively high, so that it cannot readily be furnished to a large number of consumers.

U.S. Pat. No. 4,503,468 shows a pair of linked terminals which are capable of generating images and altering such images at local and remote input devices. U.S. Pat. No. 4,360,827 shows a method and system for establishing interactive audio and video conferences. The audio signal is sent over ordinary telephone lines, while the video signal is transmitted via satellite. U.S. Pat. No. 4,349,701 relates to a television receiver which has telephone network access means. The receiver provides for viewing a television picture while utilizing a talk channel for carrying out a two-way telephone conversation. U.S. Pat. No. 4,338,492 also shows a similar system.

U.S. Pat. No. 4,494,144 shows a reduced bandwidth video transmission system which is designed to provide a good video signal of selected portions of a bandwidth. U.S. Pat. No. 4,485,400 shows apparatus and a method for transmitting video data over telephone lines, and is said to be particularly useful for transmitting and receiving images of persons speaking to each other. The method utilizes a television camera with slow scanning and image retaining means for displaying the image of a person having a similar unit.

U.S. Pat. No. 4,388,489 shows a so-called video conversational data communication network to permit conversational video textual data transmission. U.S. Pat. No. 4,386,365 shows a wired broadcast system for television, so as to provide visual communication through a frequency changer.

THE INVENTION

The present invention provides a method and apparatus for simultaneously sending an audio and a video signal over an ordinary telephone line. The invention provides the capability of carrying out a two-way telephone conversation, while at the same time a video image is being sent over the line. It provides for transmission of selected or time-selected images of the speakers during a telephone conversation and it likewise permits the transmission of graphic, printed, or other visual information at the same time that the matter is being discussed.

Briefly, the invention comprises a method for the simultaneous transmission of voice and video information over a standard telephone line, having a limited bandwidth, for example, of from 300 to 3500 hertz, which method comprises obtaining one frame of a video image, converting the video image to a binary number or other digitized form, optionally reading at least a portion of the digitized video image to a random access memory, using the digitized image from the memory to modulate a signal so that marks and spaces are used to represent the zeros and ones of the digitized image, the marks and spaces being in the range, for example, of from about 2400 to less than 4000 hertz, and preferably less than about 3500 hertz, filtering voice signals with a low pass filter to limit the range of such voice signals to a frequency range outside of the digitized image signals, and in certain preferred embodiments, a frequency range lower than the video signal band, combining the modulated image signals and the filtered voice signals, and transmitting such signals over the standard telephone line.

The invention also contemplates receiving such transmitted signals, passing the signals through a filter to separate and recover the audio and image signals, as for instance, passing the signals through a high pass filter to remove the audio signals and produce a video signal comprising marks and spaces, feeding the audio signal to a receiving means, and feeding the visual signal to a means which restores the picture as sent.

The invention further contemplates apparatus for the simultaneous transmission of audio and video information over a standard telephone line having a limited bandwidth which apparatus comprises means to receive an audio signal, means for providing one frame of a video image, means for converting the video image to a binary number or other digitized form, means for modulating a signal with the digitized image to modulate a signal to provide marks and spaces to represent one's and zero's of the digitized image, the marks and spaces being in one range of the bandwidth, filter means to limit the frequency range of the audio signals to a portion of the bandwidth other than that used by the the modulation of the marks and spaces, means to combine the modulated image signals and the filtered audio signals, and means to transmit the combined signals over the standard telephone line. Also contemplated is apparatus for receiving and reconstituting the audio signal and the image produced by the foregoing apparatus which reconstituting apparatus comprises means for receiving the combined signals from the standard telephone line, filter means to separate the frequency range of the audio signals and the frequency range of the modulated image signals, transducer means to produce audio output from the audio signals, demodulation means to convert the marks and spaces of the frequency range containing the marks and spaces to an image bit stream, and means to produce an image from the image bit stream.

In one preferred embodiment, the invention also provides a novel apparatus comprising a "frame grabber" or image capture board to obtain a single frame of an image, a modem, a high pass filter for the modem to produce video signals, a telephone transmitter or microphone for audio signals, a low pass filter for the audio signals, and means for placing the video and audio signals onto a standard telephone line.

The present invention is further described with respect to the accompanying drawings, wherein.

Figure 1:
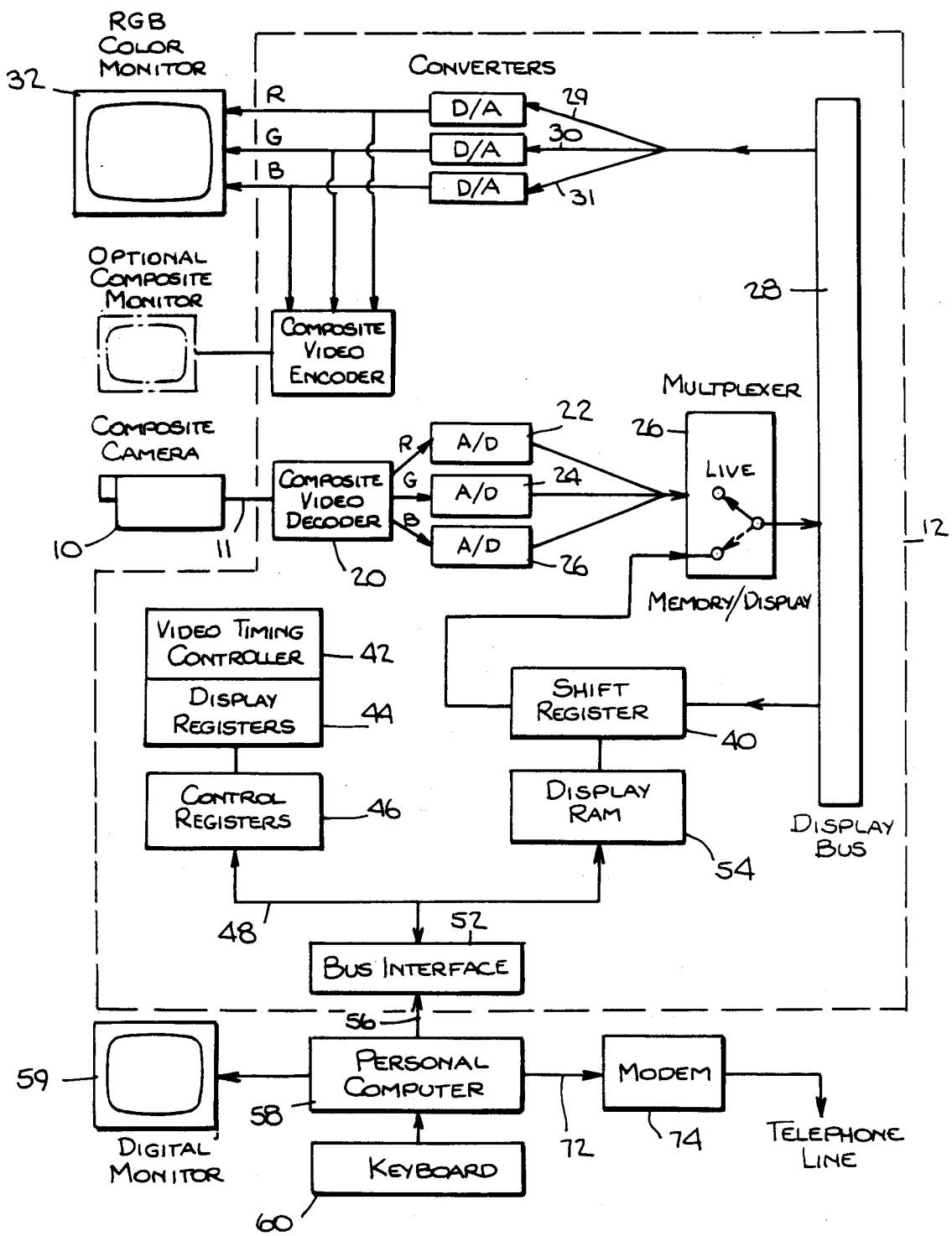
FIG. 1 is a schematic of an embodiment of a system for obtaining an image of a subject.

Referring to FIG. 1, camera 10 is used to obtain an image of a person, a group of persons, an object such as a chart or drawing, or other subject of which it is desired to transmit an image. One camera suitable for monochrome use is Micron-Eye, produced by Micron Technology, Inc. An NTSC composite video signal is sent to "frame grabber" 12 through line 11. Frame grabber 12 is an AT&T Targa 16 standard image capture board, with others being available from a number of manufacturers, such as Idetix by General Imaging Corporation. It will be understood that while the transmission of the image to image capture board 12 is presently described in terms of an NTSC composite video signal, the image could equally well be a PAL, SECAM, HDTV (high definition television), or RGB signal.

Image capture board 12 comprises decoder 20 which decodes the NTSC signal to its RGB (red-green-blue) components and feeds each of the separate colors to its respective analog-to-digital converter 22, 24, and 26. The converters feed the digitized signals to switchable multiplexer 26 which can feed the digitized signals either to memory 54 or directly to monitor 32. Multiplexer 26 is shown in the latter mode. In this latter, or "live", mode, multiplexer 26 feeds the signals to display bus 28 and thence to digital-to-analog converters 29, 30, and 31 which respectively provide red, green, and blue signals to RGB color monitor 32. It will be understood that the image produced by camera 10 could equally well be a monochrome image or it could be converted to a monochrome image, and that monitor 32 could be an NTSC monitor coupled to camera 10 either directly or through display bus 28.

The function of monitor 32 is to provide the opportunity to view the image from camera 10 and to select a particular frame which it is desired to transmit over the ordinary telephone line according to this invention. Multiplexer 26 can also be set to select the frame of interest through shift register 40. To this end, image capture board 12 contains video timing controller 42, display registers 44, and control registers 46. Control registers 46 communicate with bus interface 52 through conduit 48 and with display RAM (random access memory) 54 through line 50. Display RAM 54 communicates in turn with shift register 40 via conduit 55.

Bus interface 52 communicates with central processing unit (CPU) 58 through bus 56. The CPU used can be for example an IBM PC AT provided with monitor 59 and keyboard 60. Thus, image capture board 12 functions as described to provide an image which can be stored in memory and retained for transmitting. As shown in FIG. 1, the multiplexer is in the live/capture mode which displays a "live" image on monitor 32. When the desired image is seen on monitor 32, multiplexer 26 transfers or "grabs" that image to display RAM 54. The image can be transmitted immediately in one aspect of the invention, or alternatively it can be fed to mass storage such as a floppy diskette, bubble memory, tape or a hard disk or disk pack for later transmission.

Figure 2:
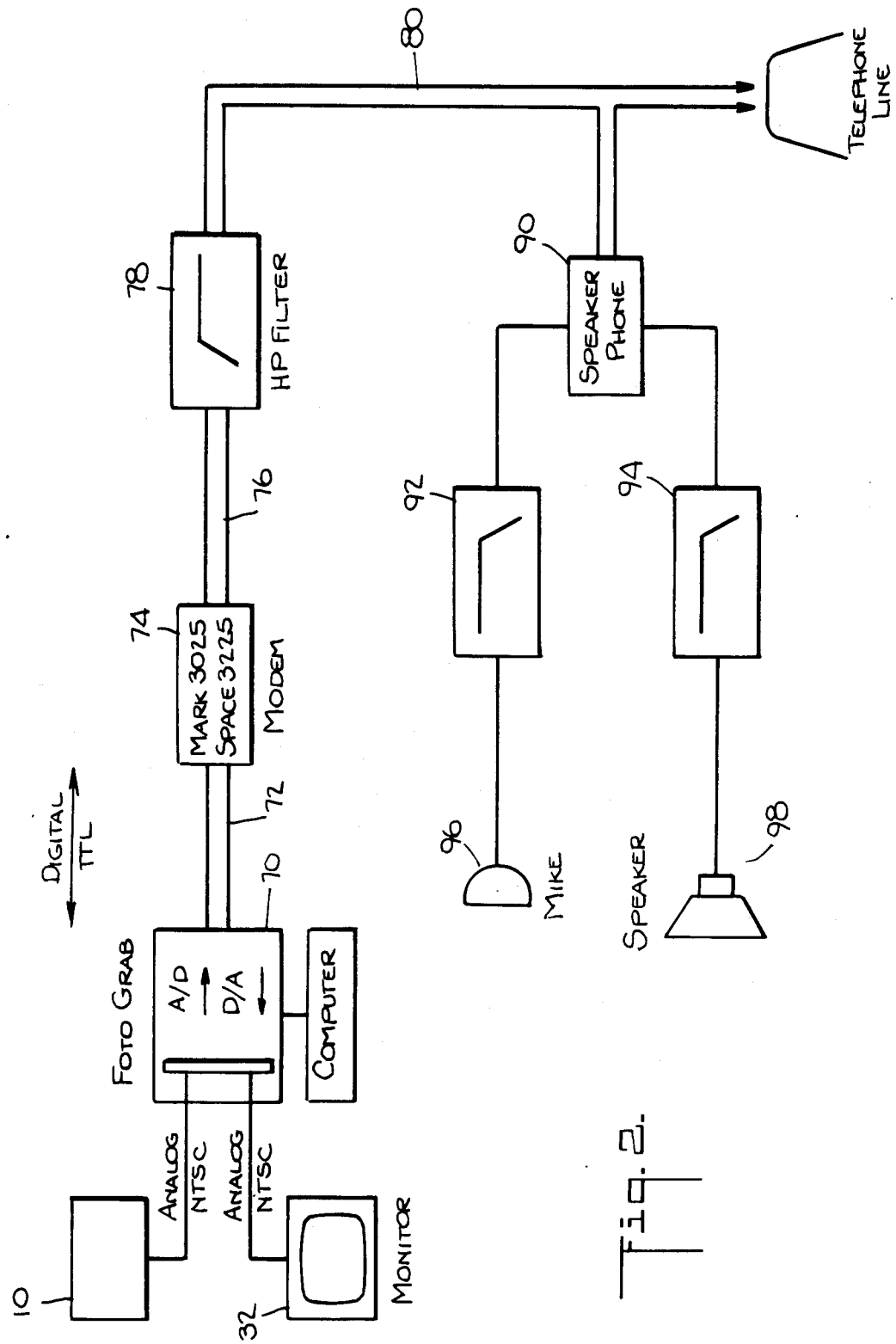
FIG. 2 is a schematic of an embodiment of a system for sending the images.

FIG. 2 shows camera 10 and monitor 32 connected to image capture board 12 and CPU 58, shown as computer unit 70. The digital signals from computer unit 70 communicate with modem 74 via channel 72. Modem 74 is a standard Bell 212A protocol modem which normally operates at 2400 Hz. It will be appreciated from the present disclosure that various commercial modems can be modified for use in the practice of this invention. Thus, an Avatex 1200 bps modem made by E+E DataComm Corp, Sunnyvale, Calif., can readily be utilized. In order to accomplish transmission according to the present invention, the 22 MHz crystal of the standard Bell 212A protocol modem is replaced with a 29 MHz crystal. This changes the operation of the modem from 2400 Hz to 3200 Hz and provides a broader channel for the audio signals. It will be understood that in this loopback mode of operation there are no originate and answer modes possible, so that duplex operation is not used in this embodiment. When an image is to be received from another site, modem 74 is not itself sending an image. A modem can also be constructed to use non-Bell 212A protocol originate mark-and-space and answer mark-and-space frequencies, so full duplex operation is available.

Modem 74 converts the digital signals it receives from CPU 70 to DPSK (dibit-encoded differential phase-shift keying) signals which modem 74 sends out through line 76. Line 76 conveys the DPSK analog signals though line 76 to high-pass filter 78. High pass filter 78 which is optional for the transmission of DPSK to local telephone line 80 has a sharp cut-off at 3000 Hz. Filter 78 functions importantly in the receive mode to keep lower frequency audio signals out of the circuit to modem 74 when the modem is receiving signals.

Simultaneously with the transmission of the DPSK signals from modem 74 through local line 80 and thence to the ordinary telephone company subscriber "loop" or line 82, voice signals are transmitted to line 80 and thence to loop 82. Appropriate coupling means (not shown) can be incorporated at the local loop portal, if desired or if required by telephone or PTT rules or tariffs.

In the embodiment shown in FIG. 2, speaker phone 90 is modified by connecting it to microphone 96 through low pass filter 92 and by connecting it to speaker 98 through low-pass filter 94. Each of filters 92 and 94 sharply attenuates frequencies above about 2800 Hz in the FIG. 2 embodiment of the invention. This has the effect of keeping the 3 kHz-plus video signals out of the audio circuits and also keeps the audio signals above 3 khz out of the video circuits. Modified speaker phone 90 and its associated components are thus capable of receiving and of transmitting voice signals in the audio duplex mode through line 80 and from and to subscriber loop 82. It will be apparent to those skilled in the art that once the signals transit the local loop, they are treated at the local exchange just as any regular telephone signals and they can either be switched locally or through a long lines network. Similarly, signals such as those produced by apparatus like that of FIG. 2 can also be fed into subscriber loop 82 to local line 80.

From this description, it will be apparent to those skilled in the art that signals transmitted to loop 82 from local line 80 contain audio frequencies in the range of, say, 300 Hz to about 3500 Hz. This is safely within the standard telephone line bandpass. The actual telephone lines may not carry frequencies down toward zero Hertz, but they do generally carry the frequency range of 300–3500 Hz. Line 80 will contain audio frequencies of 300 to about 2800 Hz. It has been found that this bandpass for the voice frequencies is more than ample to give good recognition of voices and good intelligibility of speech. Simultaneously, while the voice information is being carried below 3000 Hz, video is simultaneously being carried simplex over the same telephone lines.

In the system described in FIG. 2, the speed of video or picture information transmission is restricted. At the resolution of 200 lines by 256 pixels on the horizontal lines and using 2 bytes per pixel, it is necessary to transmit 102,418 bytes. At the rate of 120 bytes/second, it requires two minutes to transmit one full frame. In actual use, compression techniques known in the art are used so that as little as 16 k Bytes can be used to transmit an acceptable image. Under these conditions, a frame can be transmitted in a little over two minutes. It will be appreciated that the transmission time can be reduced to one-half with a 2400 bps modem or to one-eighth of this time with a 9600 bps modem.

The compression techniques referred to herein are well-known in the art. For example, ".ICB" or ".VDA" files can be created from images such as those obtained by camera 10. It should also be noted that the present methods permit the transmission of computer graphics and images generated by methods other than direct TV photography, while at the same time permitting the transmission of voice information.

While the present invention is described in terms of compressing both voice and images into standard telephone lines, it will be appreciated that these methods can also be used simultaneously to transmit two different channels of information on a single conduit by filtering the two channels and keeping them separate during transmission on a single information channel. If for instance a high-quality telephone line were used, it is possible to transmit high-quality audio and images. Moreover, the image channels can themselves be broadened to permit the simultaneous transmission of two or more images or the more rapid transmission of each frame of an image.

Assuming that the picture is monochrome and that each bit represents one pixel, it would require 29,406 bytes to encode one frame. In this embodiment, the modem encodes the digital image utilizing frequencies which are above 3 kHz and below 4 kHz, or below some other figure which is less than the upper bandwidth limit of the telephone line. It has been found useful to utilize a frequency of 3025 Hz for the "mark" and 3225 Hz for the "space".

It has been found desirable that the cut-off should be sharp and a high roll-off rate is also desirable in certain preferred embodiments.

In order to obtain the audio portion of the signal, the voice is picked up through a transducer, such as microphone 96. The signal is then sent through a low pass filter having a sharp cut-off at or below 3 kHz.

The audio output of the low pass filter is combined with the video output of the high pass filter and the composite signal is fed through line 80 to a standard telephone loop. Such loops are generally capable of handling a band pass of 300 Hz to 3500 Hz, so that the combined audio and video signal is converted to be within the band which an ordinary unconditioned telephone loop can handle.

In order to receive a signal, the same equipment is utilized. The incoming signal contains audio information in the band of 300 Hz to 3000 Hz. The incoming signal is passed through a low pass filter having a cut-off at 3000 Hz. This filter generally has the same cut-off characteristics as the low pass filter used in conjunction with the outgoing audio signal. The signal from the low pass filter is then passed through an amplifier to speaker 98.

In one embodiment a speaker phone can be used, in which case the amplifier is unneeded and the audio signal from the speaker phone is passed through the low pass filter before reaching the speaker. The video signals are passed through the same high pass filter shown for the outgoing video signal.

Figure 3:
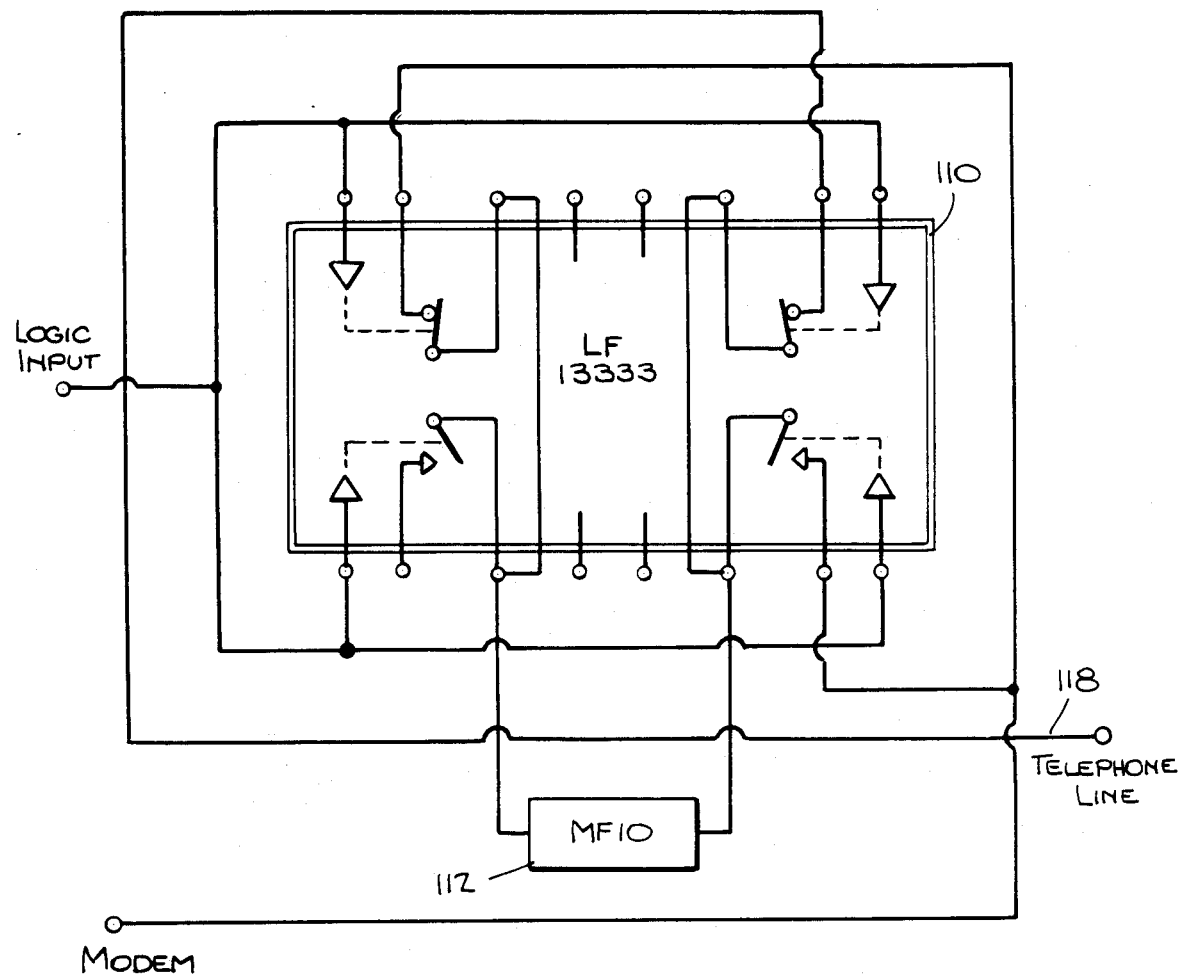
FIG. 3 is a schematic of a high pass filter reversing switch.

FIG. 3 shows reversing switch 110 which is a National Semiconductor LF13333, a 16-pin DIP. In effect, it functions as a double-pole, double-throw device to switch high pass filter 112, for instance, a National Semiconductor MF10. This provides falloff at the low end of the frequency range of 24 db per octave. Two of these National Semiconductor MF10 filters are gauged to provide roll-off with a rate of 48 db per octave.

FIG. 3 shows reversing switch 110 in the logic "0" state for the transmit mode. The logic input from a switch is input via line 114 which in turn connects the modem through line 116 and telephone line 118.

Those skilled in the art will appreciate that the presently described method and apparatus has broad application to simultaneous transmission of various kinds of information, and the invention is to be construed according to the accompanying claims. It will be appreciated for instance that the method can be used with communications channels which are not as band-limited as conventional telephone lines. Thus, a "high quality" telephone line can be used to provide a higher bit rate for the transmission of the video information or to provide a broader frequency response for the audio portion of the transmitted information. If very broadband transmission channels are available, real-time pictures can be transmitted with simultaneous voice communication.

The invention is thus capable of compressing audio and video information into a narrower bandwidth than heretofore customary or possible. Broader bandwidth can also be utilized to provide two sets of mark and space frequencies so that duplex video exchange can take place.

It will accordingly be appreciated from the present disclosure that the portion of the limited bandwidth of a channel used by the audio signal and the portion used by the video signal can be selected depending upon the total bandwidth available in the channel, the audio fidelity, resolution of the video image, speed of transmission of the video image, nature of the video image protocol, and the like. The bit rate of the modem can also influence this. It has been found in practice that acceptable audio fidelity is obtained by using a sharp audio roll-off beginning at about 2400 Hz and by rolling-off the video at frequencies below about 3000 Hz. The audio signal is filtered so that it will not interfere with the video portion of the channel and the video signal can be filtered to ensure that more of that signal is combined with the audio. At the receiver, at least the video is filtered to remove it from the audio, and both signals can be filtered separately.

What is claimed is:

1. A method for the simultaneous transmission of audio and video information over a channel having a limited bandwidth which method comprises obtaining an audio signal, providing one frame of a video image, converting the video image frame to a digitized form, using the digitized image to modulate a signal to provide marks and spaces to represent one's and zero's of the digitized image, the marks and spaces being in one range of the bandwidth, limiting the frequency range of the audio signals to a portion of the bandwidth other than that used by the modulation of the marks and spaces, combining the modulated image signals and the filtered audio signals, and transmitting the combined signals over the limited bandwidth channel.

2. A method according to claim 1 wherein the modulated image signals are in the higher frequency range of the bandwidth and the audio signals are in the lower frequency range of the bandwidth.

3. A method according to claim 1 wherein the digitized image is read to a random access memory and the digitized image from the random access memory is read to modulate signals from a modem.

4. A method according to claim 1 wherein the channel is a standard telephone line having a passband of from about 300 to about 4000 Hz, the modulated image signals are in a range commencing at or above about 3000 Hz, and the audio signals are limited to a range below about 2400 Hz.

5. A method according to claim 4 wherein the modulated image signals are in the range of from about 3000 Hz to about 3500 Hz.

6. A method according to claim 1 wherein the transmitted combined signals are received from the channel, filtered to separate the range containing the audio signal from the range containing the modulated image signal, the audio signal is fed to a transducer to reproduce the audio signal, the spaces and marks are demodulated to provide a digital bit stream, and an image is formed on a display device from the digital bit stream.

7. A method according to claim 6 wherein the digital bit stream is saved in a random access memory.

8. A method according to claim 6 wherein the audio signals are in the lower portion of the passband and a low-pass filter is used to separate the range containing the audio signal and the range containing the modulated image signal.

9. Apparatus for the simultaneous transmission of audio and video information over a channel having a limited bandwidth which apparatus comprises means to receive an audio signal; means for providing one frame of a video image; means for converting the video image to a digitized form; means for converting the digitized form of the image to provide marks and spaces to represent one's and zero's of the digitized image, the marks and spaces being in one range of the bandwidth; filter means to limit the frequency range of the audio signals to a portion of the bandwidth other than that used by the marks and spaces; means to combine the converted digitized form and the filtered audio signal, and means to transmit the combined signals over the channel.

10. Apparatus according to claim 9 wherein the video image providing means is a camera.

11. Apparatus according to claim 9 wherein the video image providing means is a computer diskette file.

12. Apparatus according to claim 9 wherein the video image conversion means is an image capture board.

13. Apparatus for receiving and reconstituting the audio signal and the image from the video produced by the apparatus of claim 9 which receiving apparatus comprises means for receiving the combined signals from the standard telephone line, filter means to separate the frequency range of the audio signals and the frequency range of the modulated image signals, transducer means to produce audio output from the audio signals, demodulation means to convert the marks and spaces of the frequency range containing the marks and spaces to an image bit stream, and means to produce an image from the image bit stream.

14. Apparatus according to claim 9 wherein the channel is a standard telephone line, the filtered audio signals are in the range of up to about 2400 Hz, and the range of the converted digitized form is from about 3000 Hz to about 3500 Hz.

15. Apparatus according to claim 14 comprising a switched high pass filter.

* * * * *